US010771317B1

(12) United States Patent
Joarder et al.

(10) Patent No.: US 10,771,317 B1
(45) Date of Patent: Sep. 8, 2020

(54) REDUCING TRAFFIC LOSS DURING LINK FAILURE IN AN ETHERNET VIRTUAL PRIVATE NETWORK MULTIHOMING TOPOLOGY

(71) Applicant: Juniper Networks, Inc., Sunnyvale, CA (US)

(72) Inventors: Soumyodeep Joarder, Bangalore (IN); Kapil Arora, Bangalore (IN); Sunil Kumar Malali, Bangalore (IN); Vikram Nagarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 9 days.

(21) Appl. No.: 16/189,408

(22) Filed: Nov. 13, 2018

(51) Int. Cl.
*H04L 12/24* (2006.01)
*H04L 12/703* (2013.01)
*H04L 12/911* (2013.01)
*H04L 12/931* (2013.01)
*H04L 12/851* (2013.01)

(52) U.S. Cl.
CPC ......... *H04L 41/0663* (2013.01); *H04L 45/28* (2013.01); *H04L 47/2483* (2013.01); *H04L 47/728* (2013.01); *H04L 47/746* (2013.01); *H04L 49/354* (2013.01)

(58) Field of Classification Search
CPC ... H04L 45/28; H04L 47/2483; H04L 47/728; H04L 47/746; H04L 49/354; H04L 41/0663

See application file for complete search history.

(56) References Cited

U.S. PATENT DOCUMENTS

| 7,561,527 | B1 * | 7/2009 | Katz | H04L 43/50 370/241 |
| 8,780,699 | B1 * | 7/2014 | Hasan | H04L 1/22 370/219 |
| 9,019,814 | B1 * | 4/2015 | Mohanty | H04L 45/00 370/219 |
| 9,455,894 | B1 * | 9/2016 | Neelam | H04L 43/10 |
| 2009/0010153 | A1 * | 1/2009 | Filsfils | H04L 45/02 370/218 |

(Continued)

OTHER PUBLICATIONS

Katz et al.; RFC 5880; "Bidirectional Forwarding Detection (BFD)"; ISSN: 2070-1721; Jun. 2010 (Year: 2010).*

(Continued)

*Primary Examiner* — Gary Mui
(74) *Attorney, Agent, or Firm* — Harrity & Harrity, LLP

(57) ABSTRACT

A first network device permits a bidirectional forwarding detection (BFD) session with a second network device. The first network device is a designated forwarder for a third network device, a first link is provided between the first network device and the third network device, the second network device is a backup designated forwarder for the third network device, a second link is provided between the second network device and the third network device. The first network device detects a link failure associated with the first link between the first network device and the third network device, and provides, via the BFD session, a BFD message to the second network device. The BFD message includes an indication of the link failure, and the BFD message is to cause the second network device to be a new designated forwarder for the third network device.

20 Claims, 12 Drawing Sheets

(56) References Cited

U.S. PATENT DOCUMENTS

| | | | |
|---|---|---|---|
| 2009/0161670 A1* | 6/2009 | Shepherd | H04L 12/185 370/389 |
| 2010/0023632 A1* | 1/2010 | Liu | H04L 12/4633 709/230 |
| 2010/0329110 A1* | 12/2010 | Rose | H04L 12/462 370/217 |
| 2011/0032945 A1* | 2/2011 | Mullooly | H04L 45/58 370/401 |
| 2014/0029419 A1* | 1/2014 | Jain | H04L 41/0668 370/228 |
| 2014/0307564 A1* | 10/2014 | Li | H04L 67/141 370/242 |
| 2015/0236920 A1* | 8/2015 | Bevilacqua | H04L 43/0811 709/224 |
| 2016/0036695 A1* | 2/2016 | Mirsky | H04L 45/507 370/243 |
| 2017/0005915 A1* | 1/2017 | Mirsky | H04L 45/26 |
| 2017/0099180 A1* | 4/2017 | Singh | H04L 12/413 |
| 2017/0141963 A1* | 5/2017 | Chalapathy | H04L 41/12 |
| 2017/0257260 A1* | 9/2017 | Govindan | H04L 41/0654 |
| 2017/0288948 A1* | 10/2017 | Singh | H04L 41/0668 |
| 2018/0351855 A1* | 12/2018 | Sood | H04L 45/28 |
| 2019/0058653 A1* | 2/2019 | Mirsky | H04L 41/0654 |
| 2019/0222509 A1* | 7/2019 | Zhang | H04L 12/287 |
| 2019/0296966 A1* | 9/2019 | Gao | H04L 45/22 |

OTHER PUBLICATIONS

Katz et al.; RFC 5881; "Bidirectional Forwarding Detection (BFD) for IPv4 and IPv6 (Single Hop)"; ISSN: 2070-1721; Jun. 2010 (Year: 2010).*

Katz et al.; RFC 5883; "Bidirectional Forwarding Detection (BFD) for Multihop Paths"; ISSN: 2070-1721; Jun. 2010 (Year: 2010).*

Aggarwal et al.; RFC 5884; "Bidirectional Forwarding Detection (BFD) for MPLS Label Switched Paths (LSPs)"; ISSN: 2070-1721; Jun. 2010 (Year: 2010).*

Bhatia et al.; RFC 7130; "Bidirectional Forwarding Detection (BFD) on Link Aggregation Group (LAG) Interfaces"; ISSN: 2070-1721; Feb. 2014 (Year: 2014).*

Pignataro et al.; RFC 7880; "Seamless Bidirectional Forwarding Detection (S-BFD)"; ISSN: 2070-1721; Jul. 2016 (Year: 2016).*

Cisco Features Guides, "Bidirectional Forwarding Detection"; https://www.cisco.com/c/en/us/td/docs/ios/12_0s/feature/guide/fs_bfd.html Jan. 18, 2006 (Year: 2006).*

* cited by examiner

… (1)

REDUCING TRAFFIC LOSS DURING LINK FAILURE IN AN ETHERNET VIRTUAL PRIVATE NETWORK MULTIHOMING TOPOLOGY

BACKGROUND

An Ethernet virtual private network (VPN) (EVPN) is a standards-based technology that provides virtual multipoint bridged connectivity between different Layer 2 domains over an Internet protocol (IP) or an IP/multiprotocol label switching (MPLS) backbone network. Like other VPN technologies, such as IP VPN and virtual private local area network (LAN) service (VPLS), EVPN instances are configured on provider edge (PE) network devices (e.g., routers, switches, and/or the like) to maintain logical service separation between customer endpoint devices. The PE network devices connect to customer edge (CE) network devices (e.g., routers, switches, host devices, and/or the like). The PE network devices then exchange reachability information using multiprotocol border gateway protocol (BGP) (MP-BGP), and encapsulated traffic is forwarded between the PE network devices.

SUMMARY

According to some implementations, a method may include providing, by a first network device, a first advertisement message to a second network device, wherein the first advertisement message may include a first bidirectional forwarding detection (BFD) discriminator associated with a first link between the first network device and a third network device, wherein the first network device may be a designated forwarder for the third network device, wherein the second network device may be a backup designated forwarder for the third network device, and wherein the first network device, the second network device, and the third network device may be included in a network. The method may include receiving a second advertisement message from the second network device, wherein the second advertisement message may include a second BFD discriminator associated with a second link between the second network device and the third network device. The method may include pairing the first BFD discriminator and the second BFD discriminator to form a BFD session between the first network device and the second network device, and detecting a link failure associated with the first link between the first network device and the third network device. The method may include providing, via the BFD session, a BFD message to the second network device, wherein the BFD message may include an indication of the link failure, and wherein the BFD message may cause the second network device to be a new designated forwarder for the third network device.

According to some implementations, a first network device may include one or more memories, and one or more processors to provide a first message to a second network device, wherein the first message may include a first bidirectional forwarding detection (BFD) discriminator associated with a first link between the first network device and a third network device, and wherein the first network device, the second network device, and the third network device may be included in a network. The one or more processors may receive a second message from the second network device, wherein the second message may include a second BFD discriminator associated with a second link between the second network device and the third network device. The one or more processors may permit a BFD session between the first network device and the second network device based on the first BFD discriminator and the second BFD discriminator, and may detect a link failure associated with the first link between the first network device and the third network device. The one or more processors may provide, via the BFD session, a BFD message to the second network device, wherein the BFD message may include an indication of the link failure, and wherein the BFD message may cause the second network device to be a designated forwarder for the third network device.

According to some implementations, a non-transitory computer-readable medium may store instructions that include one or more instructions that, when executed by one or more processors of a first network device, cause the one or more processors to permit a bidirectional forwarding detection (BFD) session with a second network device, wherein the first network device may be a designated forwarder for a third network device, wherein a first link may be provided between the first network device and the third network device, wherein the second network device may be a backup designated forwarder for the third network device, wherein a second link may be provided between the second network device and the third network device, and wherein the first network device, the second network device, and the third network device may be included in a network. The one or more instructions may cause the one or more processors to detect a link failure associated with the first link between the first network device and the third network device, and provide, via the BFD session, a BFD message to the second network device, wherein the BFD message may include an indication of the link failure, and wherein the BFD message may cause the second network device to be a new designated forwarder for the third network device.

DETAILED DESCRIPTION

Figure 1A:
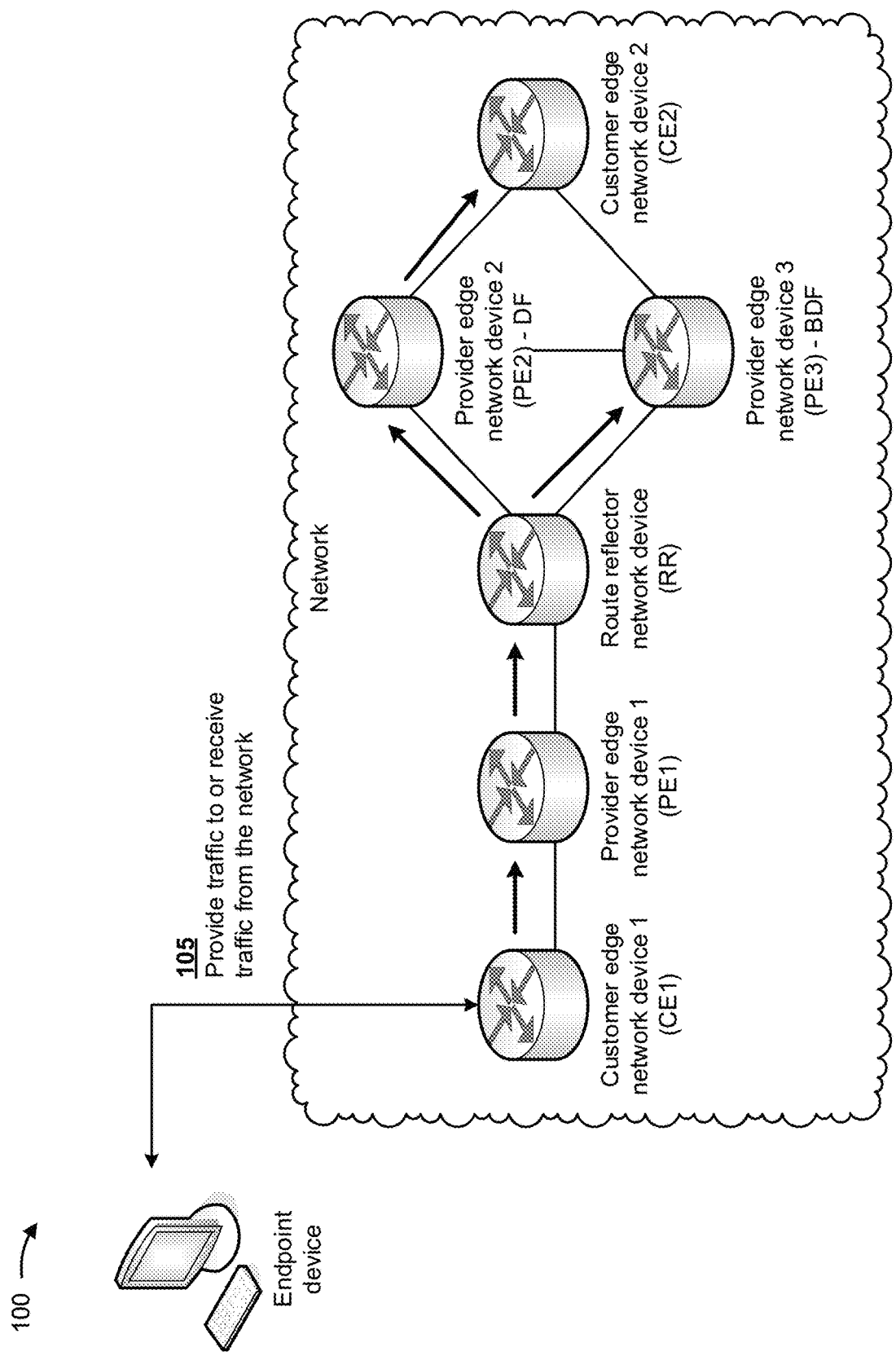
FIGS. 1A-1G are diagrams of an example implementation described herein.

The following detailed description of example implementations refers to the accompanying drawings. The same reference numbers in different drawings may identify the same or similar elements.

EVPN multihoming provides redundancy when a link or one of the PE network devices fails. In either case, traffic flows from a CE network device towards a PE network device, using remaining active links. Multihoming enables a CE network device to connect to two or more PE network devices such that traffic is forwarded using all links between the CE network device and the two or more PE network devices. However, when a link between a first PE network device (e.g., a designated forwarder (DF) of traffic) and a CE network device fails, a second PE network device (e.g., a backup DF (BDF) of traffic) must change from being the backup designated forwarder to the designated forwarder as soon as possible to begin forwarding traffic and to avoid traffic loss. Unfortunately, the time required for the second PE network device to change from being the backup designated forwarder to the designated forwarder is approximately ten to twenty seconds, which is too time consuming and leads to network traffic disruption and/or loss.

Some implementations described herein provide a first network device that reduces traffic loss during link failure in an EVPN multihoming topology. For example, the first network device may provide a first message to a second network device, wherein the first message may include a first bidirectional forwarding detection (BFD) discriminator associated with a first link between the first network device and a third network device, and wherein the first network device, the second network device, and the third network device may be included in a network. The first network device may receive a second message from the second network device, wherein the second message may include a second BFD discriminator associated with a second link between the second network device and the third network device. The first network device may permit a BFD session between the first network device and the second network device based on the first BFD discriminator and the second BFD discriminator, and may detect a link failure associated with the first link between the first network device and the third network device. The first network device may provide, via the BFD session, a BFD message to the second network device, wherein the BFD message may include an indication of the link failure, and wherein the BFD message may cause the second network device to be a designated forwarder for the third network device.

In this way, when a link failure occurs with a designated forwarder network device, a backup designated forwarded network device may be alerted and immediately become the designated forwarder network device for a network, which greatly reduces network traffic loss. A time taken to detect the link failure may be greatly reduced by leveraging data plane mechanisms, which are independent of load in the control plane and other network events.

While the following description focuses on an Ethernet virtual private network (VPN) (EVPN), implementations described herein are equally applicable to other types of protocols, networks, VPNs, and/or the like.

FIGS. 1A-1G are diagrams of an example implementation 100 described herein. As shown in FIG. 1A, an endpoint device may be associated with a network. As further shown in FIG. 1A, the network may include multiple network devices, such as a customer edge network device 1 (CE1), provider edge network device 1 (PE1), route reflector network device (RR), provider edge network device 2 (PE2), provider edge network device 3 (PE3), and customer edge network device 2 (CE2). In some implementations, the network may include an Ethernet virtual private network (EVPN) with multihoming. In some implementations, EVPN multihoming provides redundancy when a link or one of the PE network devices fails. In either case, traffic flows from a CE network device towards a PE network device, using remaining active links. For example, multihoming may enable CE1 to connect to two PE network devices (e.g., PE2 and PE3) such that traffic is forwarded using all links between CE1 and PE2 and PE3. In some implementations, PE2 may include a designated forwarder (DF) for forwarding traffic (e.g., from CE1 and via PE1 and RR) to CE2, and PE3 may include a backup designated forwarder (BDF) for forwarding traffic to CE2 when a link fails between PE2 and CE2.

In some implementations, the network may include multiple multihomed PE network devices that act as designated forwarders, backup designated forwarders, non-designated forwarders, and/or the like. In some implementations, multiple links may be associated with multiple designated forwarder network devices. Although FIG. 1A depicts two multihomed PE network devices (e.g., PE2 and PE3) and a single link between PE2 and CE2, implementations described herein may apply to a network that includes multiple multihomed PE network devices, multiple links, and/or the like.

As further shown in FIG. 1A, and by reference number 105, the endpoint device may provide traffic to and/or receive traffic from the network. In some implementations, the traffic from the endpoint device may be provided to CE1, and CE1 may provide the traffic to PE1. PE1 may provide the traffic to RR, and RR may provide the traffic to PE2 as the designated forwarder of the traffic. PE2 may provide the traffic to CE2 (e.g., via a link provided between PE2 and CE2), and CE2 may provide the traffic to another endpoint device (not shown). In some implementations, if CE2 receives traffic (e.g., destined for the endpoint device) from the other endpoint device, CE2 may provide the traffic to PE2 as the designated forwarder, and PE2 may provide the traffic to the endpoint device (e.g., via RR, PE1, and CE1).

Figure 1B:
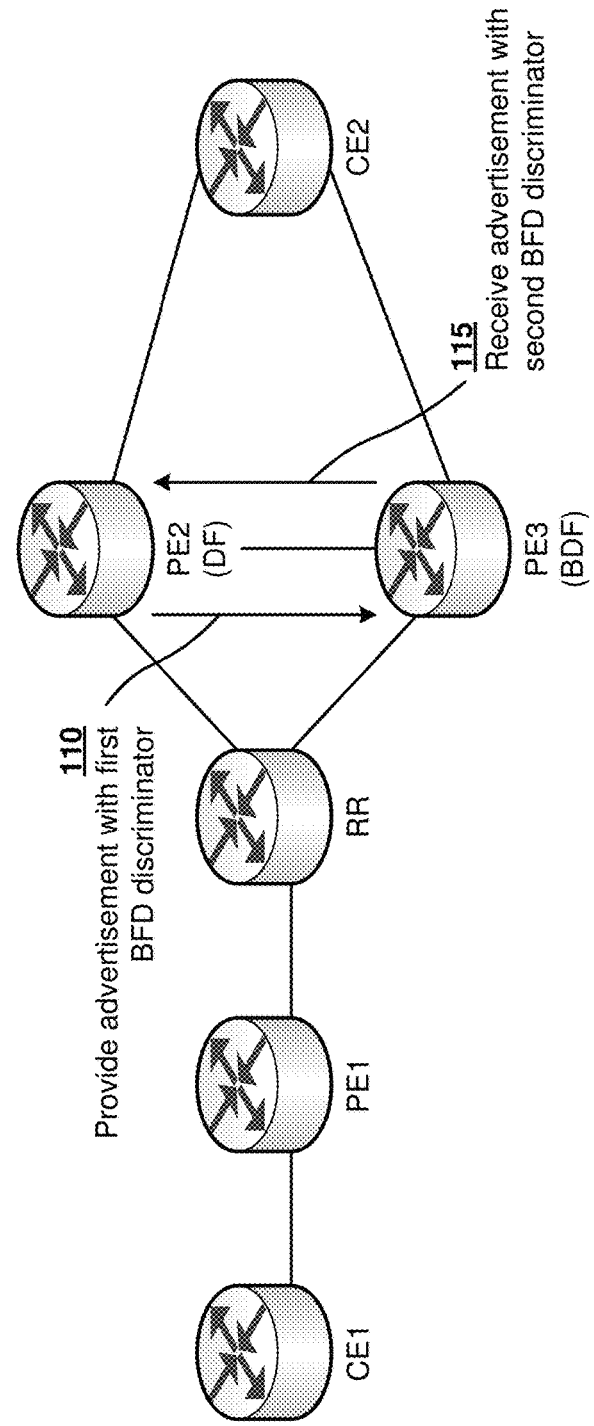

As shown in FIG. 1B, and by reference number 110, PE2 may provide, to PE3, an advertisement message with a first bidirectional forwarding detection (BFD) discriminator associated with a link between PE2 and CE2. In some implementations, the first BFD discriminator may include information identifying the link provided between PE2 and CE2 and a state of the link (e.g., operational, failing, and/or the like). In some implementations, the link may include an Ethernet signature identifier (ESI) link. In some implementations, the advertisement message may include an Ethernet virtual identifier (EVI), an ESI, and/or a virtual local area network (VLAN) advertisement message.

As further shown in FIG. 1B, and by reference number 115, PE2 may receive, from PE3, an advertisement message with a second BFD discriminator associated with a link between PE3 and CE2. In some implementations, the second BFD discriminator may include information identifying the link provided between PE3 and CE2 and a state of the link (e.g., operational, failing, and/or the like). In some implementations, the link may include an ESI link. In some implementations, the advertisement message may include an EVI, an ESI, and/or a VLAN advertisement message.

Figure 1C:
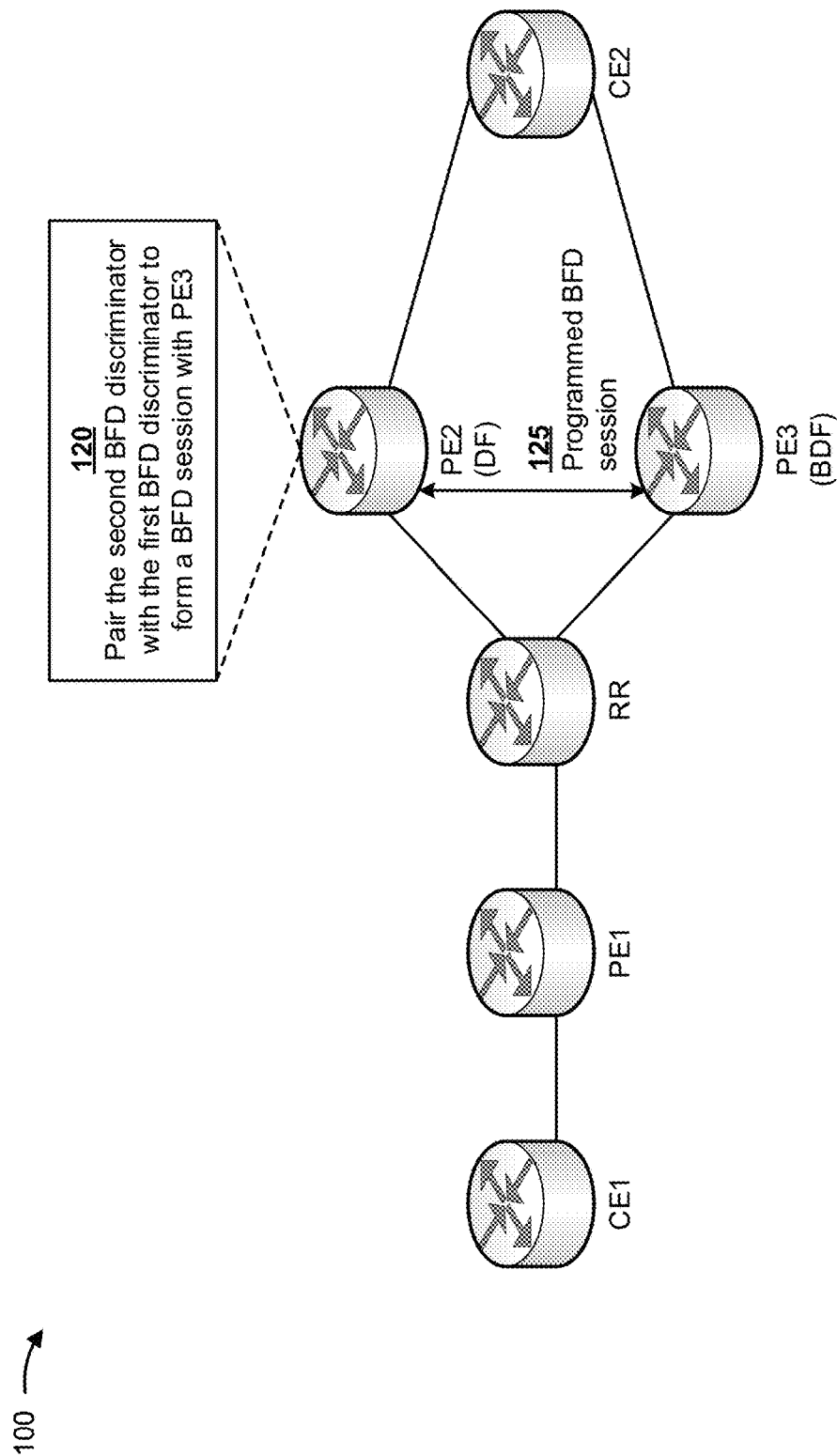

As shown in FIG. 1C, and by reference number 120, PE2 may pair the second BFD discriminator with the first BFD discriminator to form a BFD session between PE2 and PE3 (e.g., via a link provided between PE2 and PE3). In some implementations, PE2 may pair the second BFD discriminator with the first BFD discriminator when PE2 receives the advertisement message with the second BFD discriminator. In some implementations, PE3 may pair the first BFD discriminator with the second BFD discriminator when PE3 receives the advertisement message with the first BFD discriminator.

As further shown in FIG. 1C, and by reference number 125, once the first BFD discriminator and the second BFD discriminator are paired, the BFD session may be programmed (e.g., to form a programmed BFD session) and BFD messages may be exchanged between PE2 and PE3. BFD is a detection protocol designed to provide fast forwarding-path failure detection times for media types, encapsulations, topologies, routing protocols, and/or the like. BFD may be utilized to detect forwarding path (e.g., link) failures at a uniform rate, rather than at variable rates associated with different protocol hello mechanisms. BFD may make network profiling and planning easier and may make convergence time consistent and predictable. In some implementations, BFD may provide sub-second failure detection between two adjacent devices (e.g., PE2 and PE3) and may be less processing-resource intensive than other protocol hello messages, since some of the BFD load may be distributed onto the data plane.

Figure 1D:
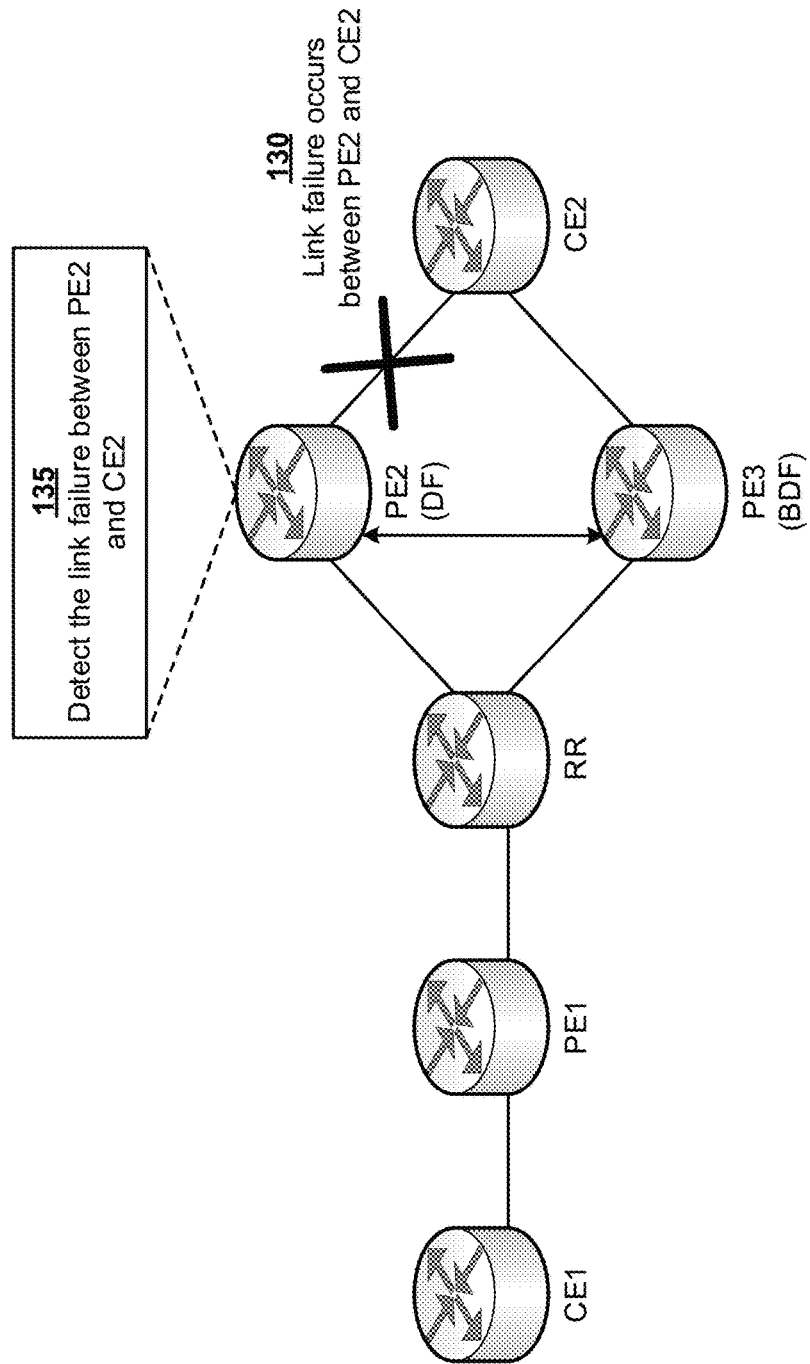

As shown in FIG. 1D, and by reference number 130, a link failure may occur at the link provided between PE2 and CE2 (e.g., the link associated with the first BFD discriminator). In some implementations, the link failure may occur when the link connecting PE2 (e.g., the designated forwarder network device) to CE2 goes down (e.g., becomes non-operational).

As further shown in FIG. 1D, and by reference number 135, when the link failure occurs at the link provided between PE2 and CE2, PE2 may detect the link failure. In some implementations, PE2 may detect the link failure based on providing a message (e.g., a hello message) to CE2 and receiving a timeout message in response to the message. In some implementations, PE2 may detect the link failure based on providing the message to CE2 and not receiving a response message from CE2 within a predetermined time period. In some implementations, PE2 may detect the link failure based on a BFD session formed between PE2 and CE2. In such implementations, PE2 and CE2 may form a BFD session in a similar manner described above for PE2 and PE3 in connection with FIG. 1C.

Figure 1E:
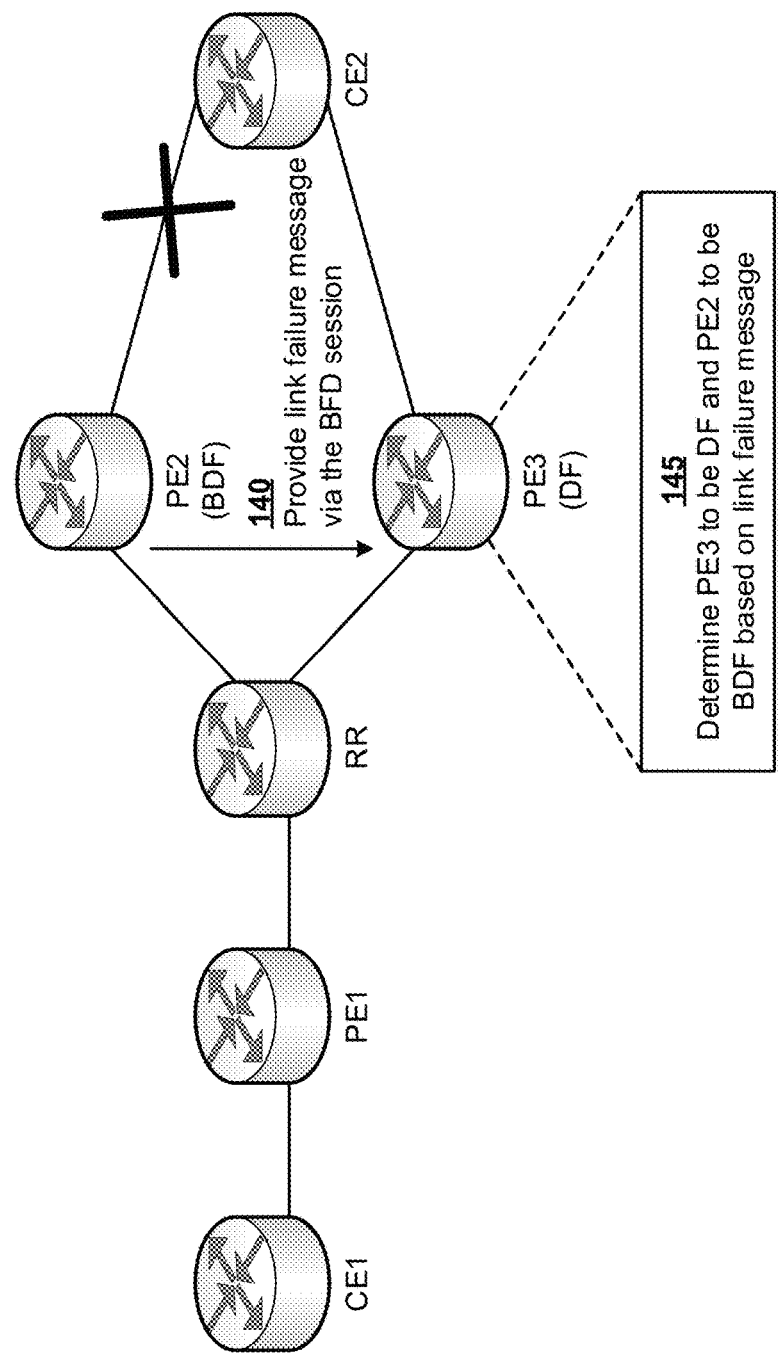

As shown in FIG. 1E, and by reference number 140, PE2 may provide, to PE3, a link failure message via the BFD session formed between PE2 and PE3. In some implementations, PE2 may provide the link failure message to PE3 as soon as PE2 detects the link failure. In some implementations, the link failure message may include a BFD message. In some implementations, the BFD message may include an indication of the link failure at the link provided between PE2 and CE2, and may cause PE3 to be a new designated forwarder of traffic for CE2 (e.g., instead of PE2).

As further shown in FIG. 1E, and by reference number 145, PE3 may determine PE3 to be the new designated forwarder of traffic for CE2 and may determine PE2 or another provider edge network device (e.g., not shown but communicating with CE2) to be a new backup designated forwarder of traffic for CE2 based on the link failure message. In some implementations, PE3 may determine that the link between PE2 and CE2 has failed (e.g., become non-operational) as soon as PE3 receives the link failure message (e.g., the BFD message). In such implementations, PE3 may mark PE3 as the new designated forwarder of traffic for CE2 (e.g., via a link provided between PE3 and CE2) based on determining that the link between PE2 and CE2 has failed. In some implementations, the link failure message (e.g., the BFD message) may cause PE3 to be the new designated forwarder of traffic for CE2 less than one second (e.g., sub-second) after PE2 detects the link failure at the link provided between PE2 and CE2.

Figure 1F:
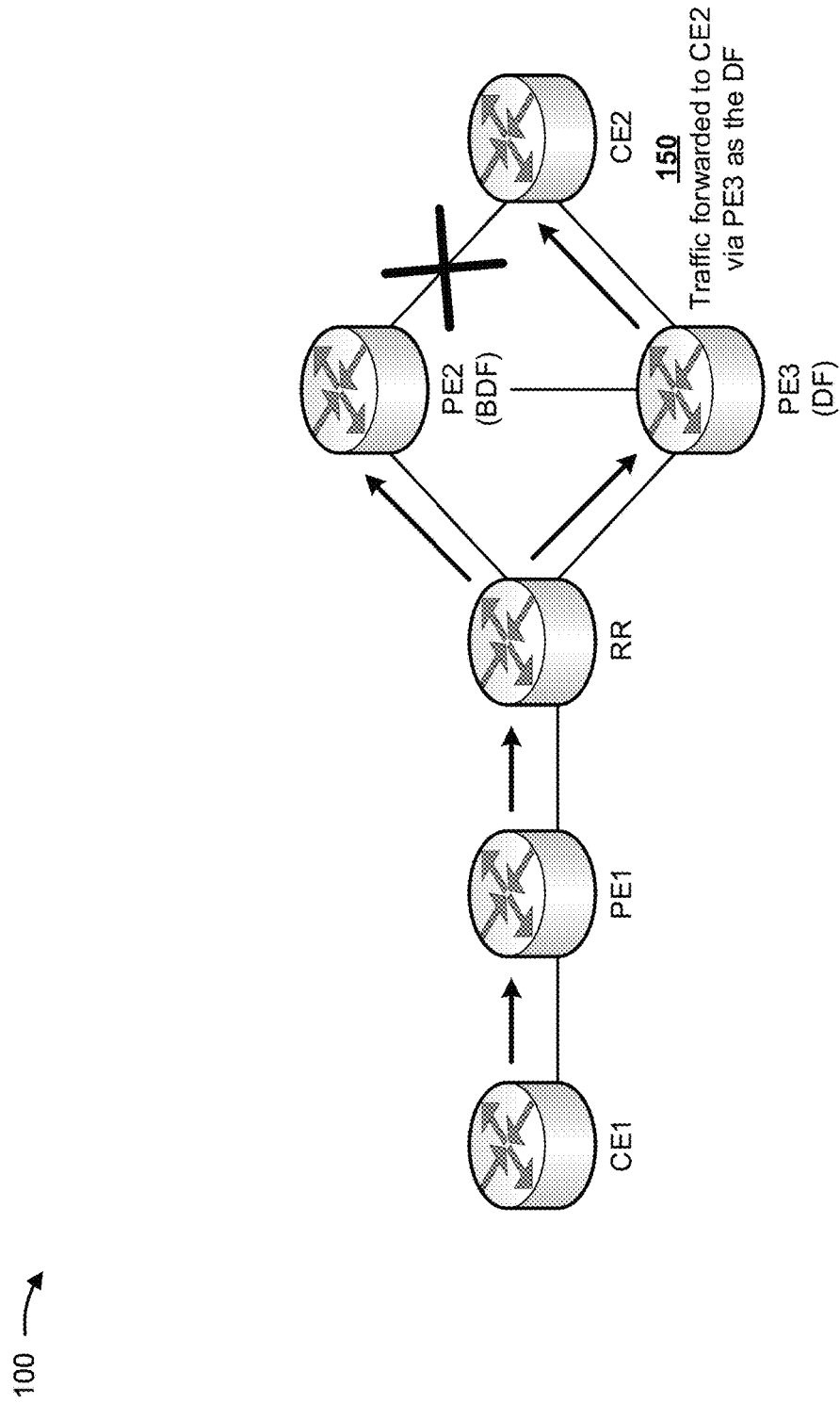

As shown in FIG. 1F, and by reference number 150, traffic may be forwarded to CE2 via PE3 as the new designated forwarder of traffic for CE2, without experiencing any significant traffic loss. In some implementations, PE3, as the designated forwarder, may forward traffic to CE2 via the link provided between PE3 and CE2. In this way, PE3 (e.g., the original backup designated forwarder) may become the new designated forwarder of traffic for CE2, and the amount of network traffic lost due to the link failure associated with the prior designated forwarder (e.g., PE2) is reduced.

Figure 1G:
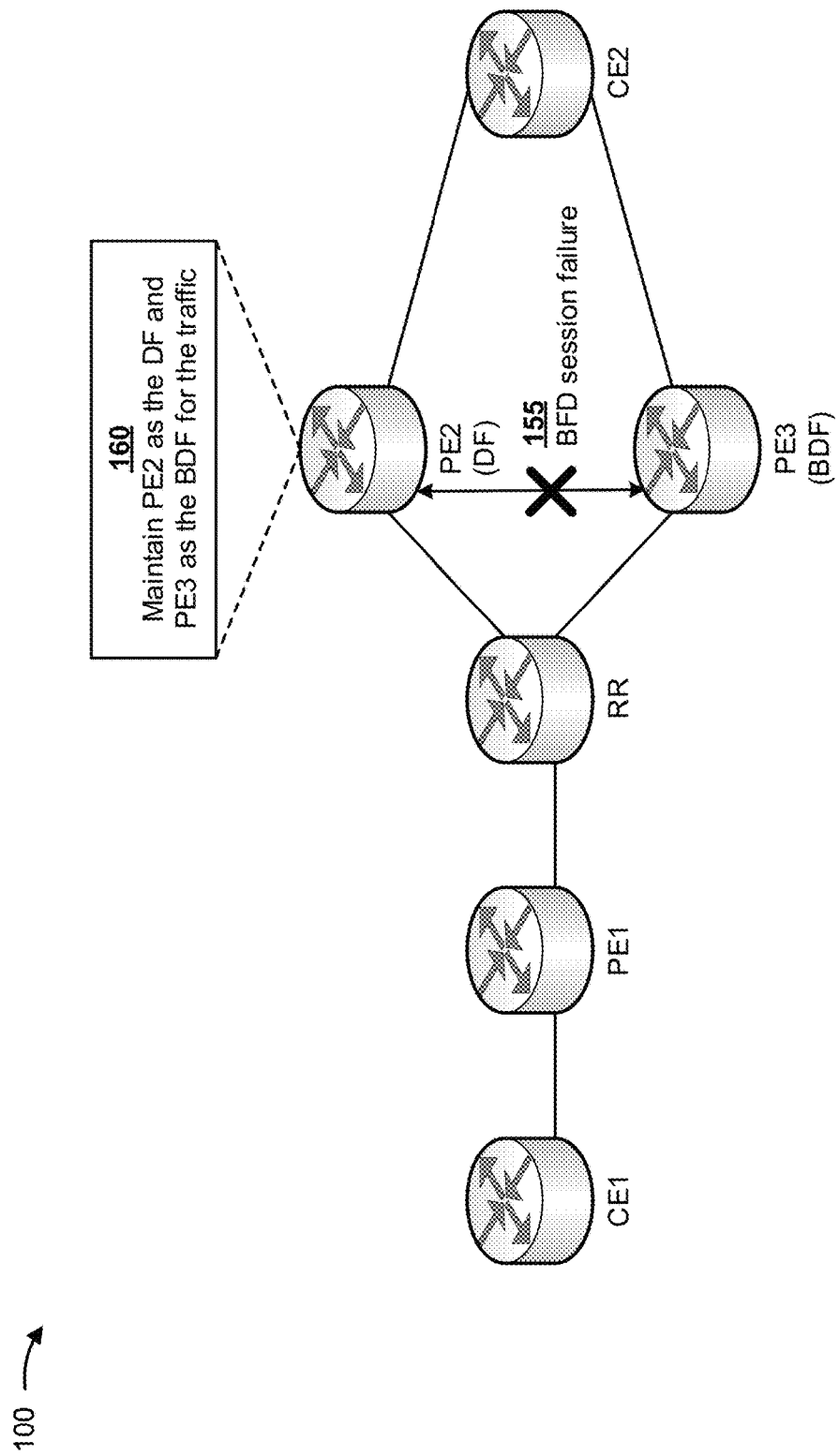

As shown in FIG. 1G, and by reference number 155, the BFD session formed between PE2 and PE3 may experience a failure prior to occurrence of the link failure at the link provided between PE2 and CE2. In such situations, and as shown by reference number 160 in FIG. 1G, PE2 may maintain PE2 as the designated forwarder of traffic for CE2 and may maintain PE3 as the backup designated forwarder of traffic for CE2. In some implementations, the BFD session failure may occur due to loss of BFD keepalive messages between PE2 and PE3. The BFD session failure may indicate a network disconnect between PE2 and PE3 but may not necessarily indicate a link failure at the link provided between PE2 and CE2. Thus, PE2 and PE3 may not take any action based on the BFD session failure. Although PE2 and PE3 may not communicate during the BFD session failure, RR may still communicate with PE2 and PE3. Furthermore, if both PE2 and PE3 are determined to be the designated forwarder of traffic for CE2, there will be duplicate designated forwarders of traffic for CE2, which is undesirable.

In this way, traffic loss may be greatly reduced during link failure in an EVPN multihoming topology, which may conserve computing resources (e.g., processor resources, memory resources, and/or the like) that would otherwise be wasted in attempting to prevent traffic loss during a link failure and/or retrieve traffic lost during a link failure. Furthermore, implementations described herein use a rigorous, computerized process to perform tasks that were not previously performed. For example, currently there does not exist a technique to reduce traffic loss during link failure in an EVPN multihoming topology. Finally, the time taken to detect the link failure may be greatly reduced by leveraging data plane mechanisms, which are independent of load in the control plane and other network events.

As indicated above, FIGS. 1A-1G are provided merely as examples. Other examples may differ from what was described with regard to FIGS. 1A-1G.

Figure 2:
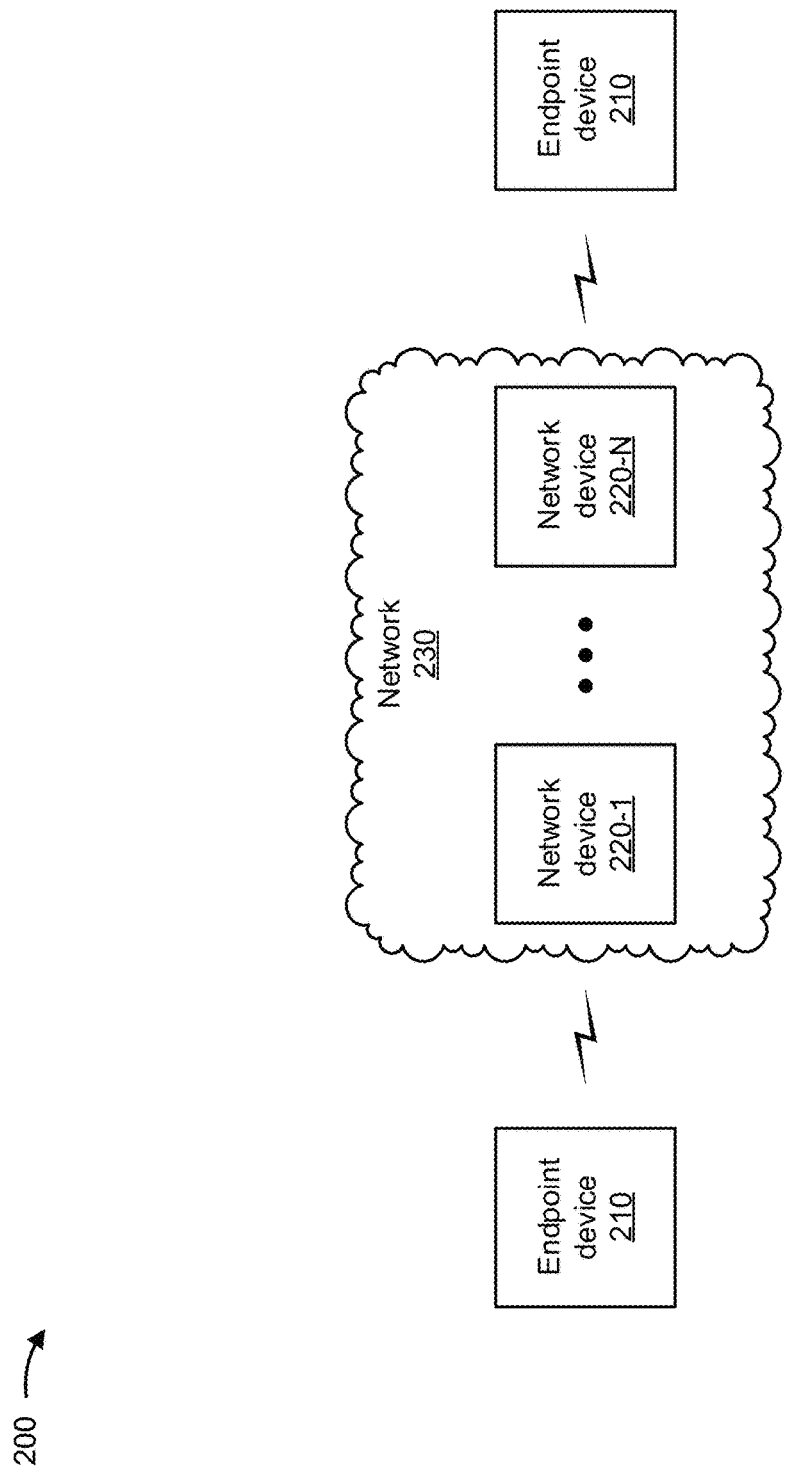
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, a packet replica, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, network devices 220 may provide an EVPN multihoming topology.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
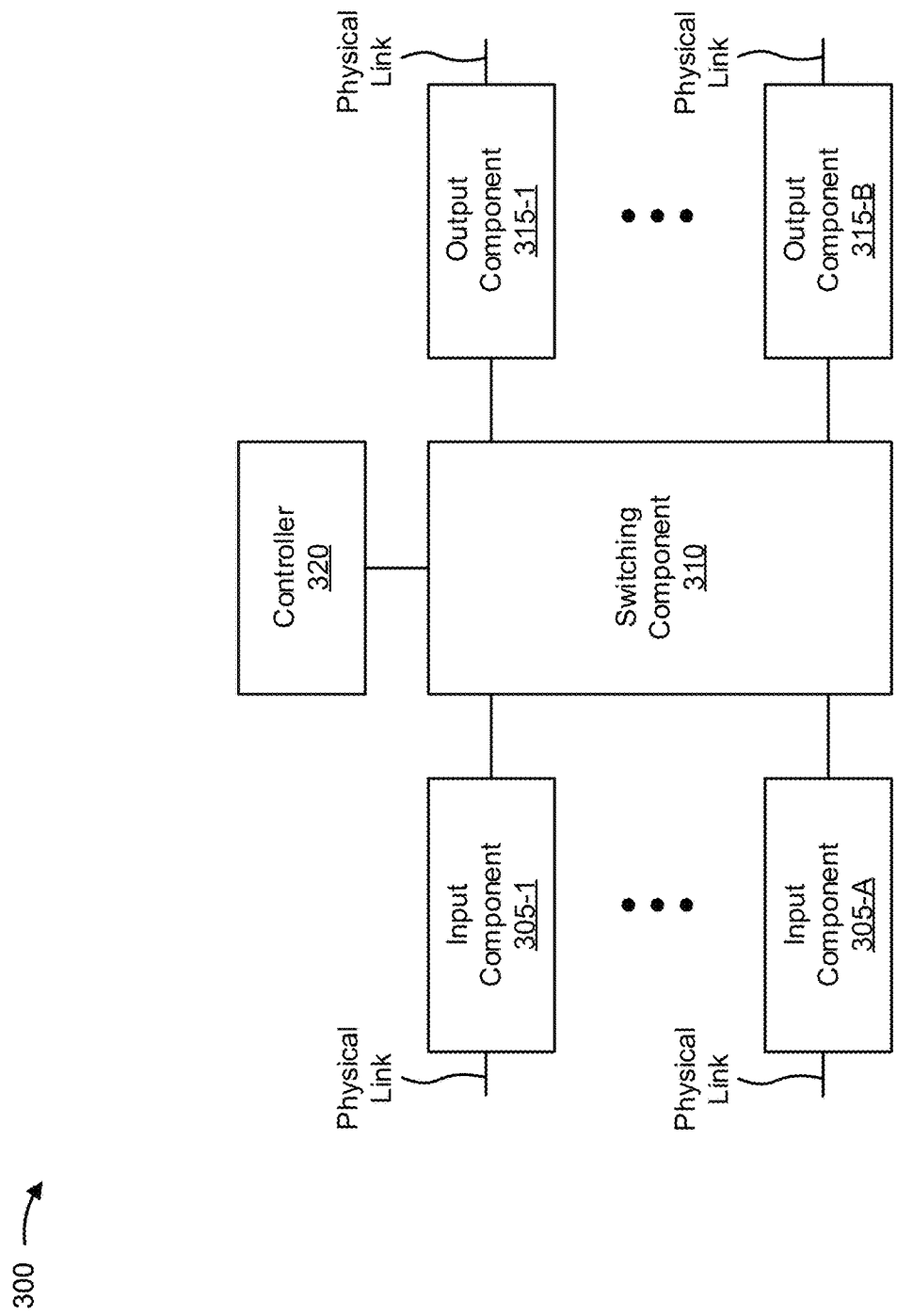
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
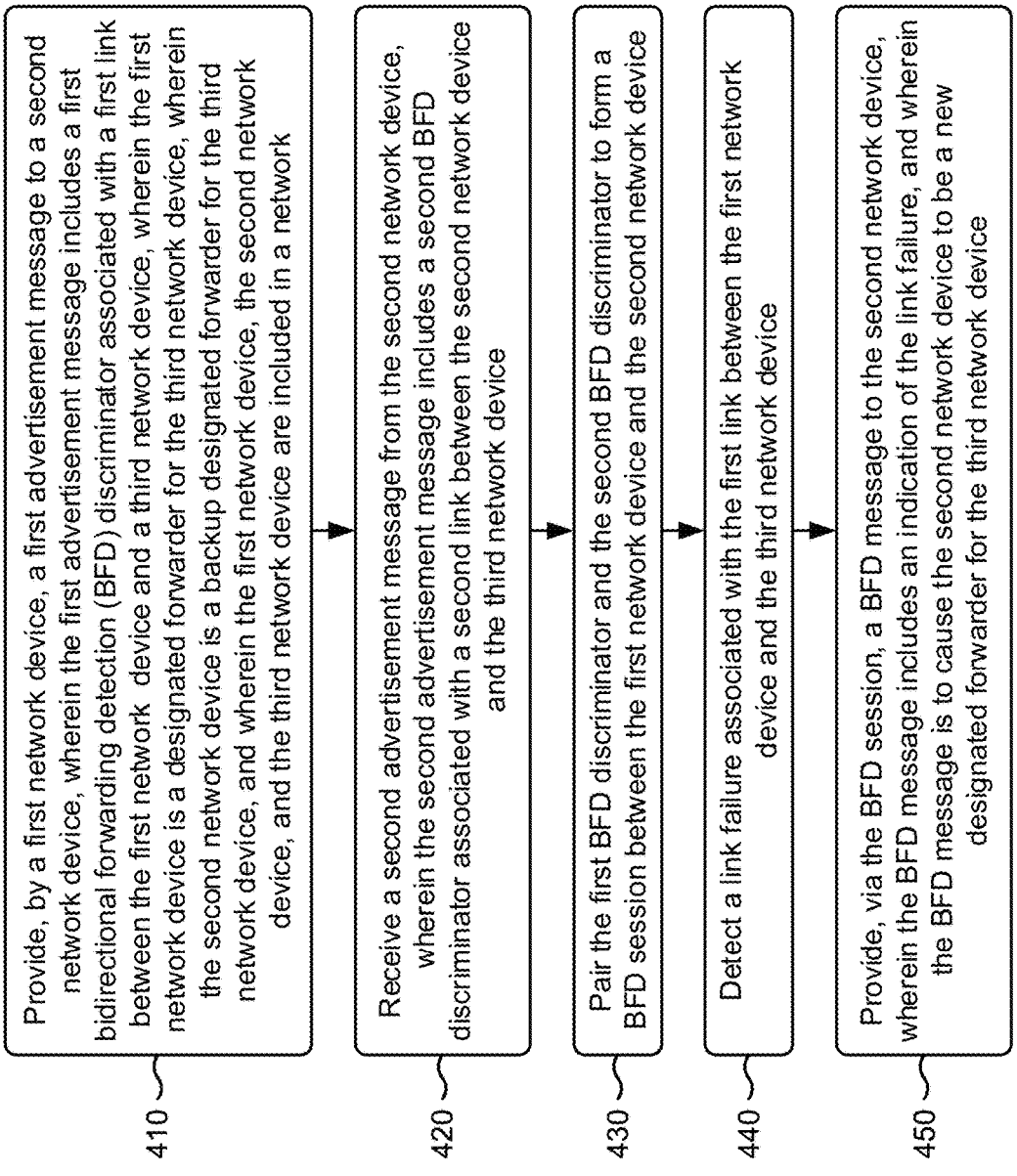
FIGS. 4-6 are flow charts of example processes for reducing traffic loss during link failure in an EVPN multihoming topology.

FIG. 4 is a flow chart of an example process 400 for reducing traffic loss during link failure in an EVPN multi-homing topology. In some implementations, one or more process blocks of FIG. 4 may be performed by a network device, such as a first network device (e.g., network device 220). In some implementations, one or more process blocks of FIG. 4 may be performed by another device or a group of devices separate from or including the network device, such as an endpoint device (e.g., endpoint device 210).

As shown in FIG. 4, process 400 may include providing a first advertisement message to a second network device, wherein the first advertisement message includes a first bidirectional forwarding detection (BFD) discriminator associated with a first link between the first network device and a third network device, wherein the first network device is a designated forwarder for the third network device, wherein the second network device is a backup designated forwarder for the third network device, and wherein the first network device, the second network device, and the third network device are included in a network (block 410). For example, the first network device (e.g., using switching component 310, output component 315, controller 320, and/or the like) may provide a first advertisement message to a second network device, as described above in connection with FIGS. 1A-2. In some implementations, the first advertisement message may include a first bidirectional forwarding detection (BFD) discriminator associated with a first link between the first network device and a third network device. In some implementations, the first network device may be a designated forwarder for the third network device, and the second network device may be a backup designated forwarder for the third network device. In some implementations, the first network device, the second network device, and the third network device may be included in a network.

As further shown in FIG. 4, process 400 may include receiving a second advertisement message from the second network device, wherein the second advertisement message includes a second BFD discriminator associated with a second link between the second network device and the third network device (block 420). For example, the first network device (e.g., using input component 305, switching component 310, controller 320, and/or the like) may receive a second advertisement message from the second network device, as described above in connection with FIGS. 1A-2. In some implementations, the second advertisement message may include a second BFD discriminator associated with a second link between the second network device and the third network device.

As further shown in FIG. 4, process 400 may include pairing the first BFD discriminator and the second BFD discriminator to form a BFD session between the first network device and the second network device (block 430). For example, the first network device (e.g., using switching component 310, controller 320, and/or the like) may pair the first BFD discriminator and the second BFD discriminator to form a BFD session between the first network device and the second network device, as described above in connection with FIGS. 1A-2.

As further shown in FIG. 4, process 400 may include detecting a link failure associated with the first link between the first network device and the third network device (block 440). For example, the first network device (e.g., using input component 305, switching component 310, controller 320, and/or the like) may detect a link failure associated with the first link between the first network device and the third network device, as described above in connection with FIGS. 1A-2.

As further shown in FIG. 4, process 400 may include providing, via the BFD session, a BFD message to the second network device, wherein the BFD message includes an indication of the link failure, and wherein the BFD message is to cause the second network device to be a new designated forwarder for the third network device (block 450). For example, the first network device (e.g., using switching component 310, output component 315, controller 320, and/or the like) may provide, via the BFD session, a BFD message to the second network device, as described above in connection with FIGS. 1A-2. In some implementations, the BFD message may include an indication of the link failure, and the BFD message may cause the second network device to be a new designated forwarder for the third network device.

Process 400 may include additional implementations, such as any single implementation or any combination of implementations described below and/or in connection with one or more other processes described elsewhere herein.

In some implementations, the first advertisement message may include at least one of an Ethernet virtual identifier (EVI), an Ethernet signature identifier (ESI), or a virtual local area network (VLAN) advertisement message, and the second advertisement message may include at least one of an EVI, an ESI, or a VLAN advertisement message. In some implementations, the BFD message may cause the first network device to be a new backup designated forwarder for the third network device.

In some implementations, the first network device may detect, prior to detecting the link failure, a failure of the BFD session, where the first network device is maintained as the designated forwarder for the third network device based on detecting the failure of the BFD session.

In some implementations, the BFD message may cause the second network device to be the new designated forwarder for the third network device less than one second after the link failure is detected by the first network device. In some implementations, the first link and the second link may include Ethernet signature identifier (ESI) links. In some implementations, the network may include an Ethernet virtual private network (EVPN) that provides multihoming.

Although FIG. 4 shows example blocks of process 400, in some implementations process 400 may include additional blocks, fewer blocks, different blocks, or differently arranged blocks than those depicted in FIG. 4. Additionally, or alternatively, two or more of the blocks of process 400 may be performed in parallel.

Figure 5:
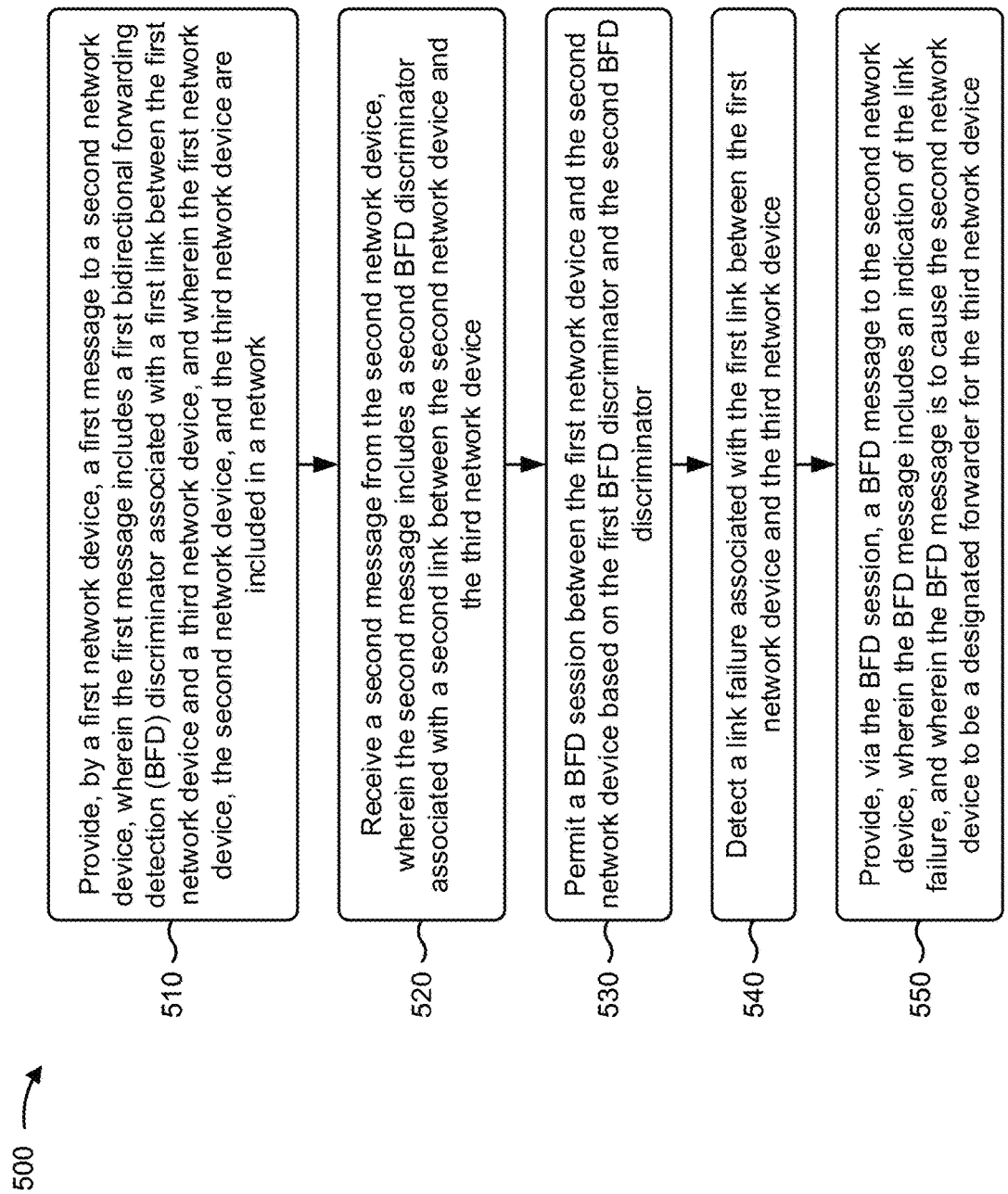

FIG. 5 is a flow chart of an example process 500 for reducing traffic loss during link failure in an EVPN multi-homing topology. In some implementations, one or more process blocks of FIG. 5 may be performed by a network device, such as a first network device (e.g., network device 220). In some implementations, one or more process blocks of FIG. 5 may be performed by another device or a group of devices separate from or including the network device, such as an endpoint device (e.g., endpoint device 210).

As shown in FIG. 5, process 500 may include providing a first message to a second network device, wherein the first message includes a first bidirectional forwarding detection (BFD) discriminator associated with a first link between the first network device and a third network device, and wherein the first network device, the second network device, and the third network device are included in a network (block 510). For example, the first network device (e.g., using switching component 310, output component 315, controller 320, and/or the like) may provide a first message to a second network device, as described above in connection with FIGS. 1A-2. In some implementations, the first message may include a first bidirectional forwarding detection (BFD) discriminator associated with a first link between the first network device and a third network device, and the first network device, the second network device, and the third network device may be included in a network.

As further shown in FIG. 5, process 500 may include receiving a second message from the second network device, wherein the second message includes a second BFD discriminator associated with a second link between the second network device and the third network device (block 520). For example, the first network device (e.g., using input component 305, switching component 310, controller 320, and/or the like) may receive a second message from the second network device, as described above in connection with FIGS. 1A-2. In some implementations, the second message may include a second BFD discriminator associated with a second link between the second network device and the third network device.

As further shown in FIG. 5, process 500 may include permitting a BFD session between the first network device and the second network device based on the first BFD discriminator and the second BFD discriminator (block 530). For example, the first network device (e.g., using switching component 310, output component 315, controller 320, and/or the like) may permit a BFD session between the first network device and the second network device based on the first BFD discriminator and the second BFD discriminator, as described above in connection with FIGS. 1A-2.

As further shown in FIG. 5, process 500 may include detecting a link failure associated with the first link between the first network device and the third network device (block 540). For example, the first network device (e.g., using input component 305, switching component 310, controller 320, and/or the like) may detect a link failure associated with the first link between the first network device and the third network device, as described above in connection with FIGS. 1A-2.

As further shown in FIG. 5, process 500 may include providing, via the BFD session, a BFD message to the second network device, wherein the BFD message includes an indication of the link failure, and wherein the BFD message is to cause the second network device to be a designated forwarder for the third network device (block 550). For example, the first network device (e.g., using switching component 310, output component 315, controller 320, and/or the like) may provide, via the BFD session, a BFD message to the second network device, as described above in connection with FIGS. 1A-2. In some implementations, the BFD message may include an indication of the link failure, and the BFD message may cause the second network device to be a designated forwarder for the third network device.

Process 500 may include additional implementations, such as any single implementation or any combination of implementations described below and/or in connection with one or more other processes described elsewhere herein.

In some implementations, the first network device may be the designated forwarder for the third network device prior to the link failure, and the second network device may be a backup designated forwarder for the third network device prior to the link failure. In some implementations, the first message and the second message may include at least one of Ethernet virtual identifier (EVI), Ethernet signature identifier (ESI), or virtual local area network (VLAN) advertisement messages.

In some implementations, the first network device may detect, prior to detecting the link failure, a failure of the BFD session, where the first network device is maintained as the designated forwarder for the third network device based on detecting the failure of the BFD session. In some implementations, the BFD message may cause the second network device to be the designated forwarder for the third network device less than one second after the link failure is detected by the first network device.

In some implementations, the BFD message may cause the second network device to communicate traffic with the third network device, via the second link, after causing the second network device to be the designated forwarder for the third network device. In some implementations, the network may include an Ethernet virtual private network (EVPN) that provides multihoming.

Although FIG. 5 shows example blocks of process 500, in some implementations process 500 may include additional blocks, fewer blocks, different blocks, or differently arranged blocks than those depicted in FIG. 5. Additionally, or alternatively, two or more of the blocks of process 500 may be performed in parallel.

Figure 6:
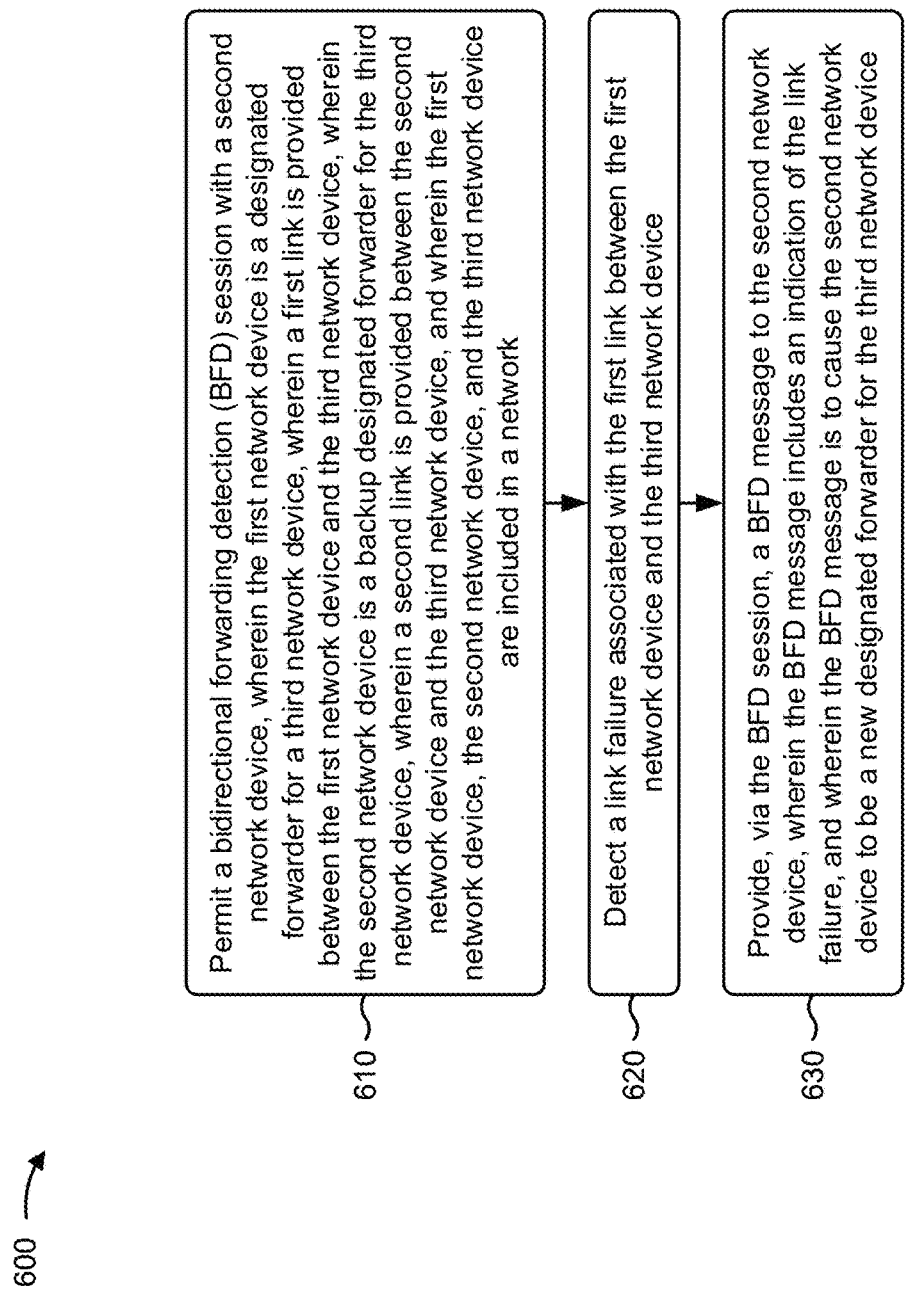

FIG. 6 is a flow chart of an example process 600 for reducing traffic loss during link failure in an EVPN multi-homing topology. In some implementations, one or more process blocks of FIG. 6 may be performed by a network device, such as a first network device (e.g., network device 220). In some implementations, one or more process blocks of FIG. 6 may be performed by another device or a group of devices separate from or including the network device, such as an endpoint device (e.g., endpoint device 210).

As shown in FIG. 6, process 600 may include permitting a bidirectional forwarding detection (BFD) session with a second network device, wherein the first network device is a designated forwarder for a third network device, wherein a first link is provided between the first network device and the third network device, wherein the second network device is a backup designated forwarder for the third network device, wherein a second link is provided between the second network device and the third network device, and wherein the first network device, the second network device, and the third network device are included in a network (block 610). For example, the first network device (e.g., using input component 305, switching component 310, output component 315, controller 320, and/or the like) may permit a bidirectional forwarding detection (BFD) session with a second network device, as described above in connection with FIGS. 1A-2. In some implementations, the first network device may be a designated forwarder for a third network device, and a first link may be provided between the first network device and the third network device. In some implementations, the second network device may be a backup designated forwarder for the third network device, and a second link may be provided between the second network device and the third network device. In some implementations, the first network device, the second network device, and the third network device may be included in a network.

As further shown in FIG. 6, process 600 may include detecting a link failure associated with the first link between the first network device and the third network device (block 620). For example, the first network device (e.g., using input component 305, switching component 310, controller 320, and/or the like) may detect a link failure associated with the first link between the first network device and the third network device, as described above in connection with FIGS. 1A-2.

As further shown in FIG. 6, process 600 may include providing, via the BFD session, a BFD message to the second network device, wherein the BFD message includes an indication of the link failure, and wherein the BFD message is to cause the second network device to be a new designated forwarder for the third network device (block 630). For example, the first network device (e.g., using switching component 310, output component 315, controller 320, and/or the like) may provide, via the BFD session, a BFD message to the second network device, as described above in connection with FIGS. 1A-2. In some implementations, the BFD message may include an indication of the link failure, and the BFD message may cause the second network device to be a new designated forwarder for the third network device.

Process 600 may include additional implementations, such as any single implementation or any combination of implementations described below and/or in connection with one or more other processes described elsewhere herein.

In some implementations, the first network device may provide a first advertisement message to the second network device, where the first advertisement message includes a first BFD discriminator associated with the first link between the first network device and a third network device, and may receive a second advertisement message from the second network device, where the second advertisement message includes a second BFD discriminator associated with the second link between the second network device and the third network device. Additionally, the first network device may pair the first BFD discriminator and the second BFD discriminator, and, when permitting the BFD session with the second network device, may permit the BFD session with the second network device based on pairing the first BFD discriminator and the second BFD discriminator.

In some implementations, the BFD message may cause the first network device to be a new backup designated forwarder for the third network device. In some implementations, the first network device may detect, prior to detecting the link failure, a failure of the BFD session, where the first network device is maintained as the designated forwarder for the third network device based on detecting the failure of the BFD session, and where the second network device is maintained as the backup designated forwarder for the third network device based on detecting the failure of the BFD session.

In some implementations, the BFD message may cause the second network device to be the new designated forwarder for the third network device less than one second after the link failure is detected by the first network device. In some implementations, the first link and the second link may include Ethernet signature identifier (ESI) links, and the network may include an Ethernet virtual private network (EVPN) that provides multihoming.

Although FIG. 6 shows example blocks of process 600, in some implementations process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
providing, by a first network device, a first advertisement message to a second network device,
wherein the first advertisement message includes a first bidirectional forwarding detection (BFD) discriminator associated with a first link between the first network device and a third network device, the first BFD discriminator including information identifying the first link and a state of the first link,
wherein the first network device is a designated forwarder for the third network device, wherein the second network device is a backup designated forwarder for the third network device, and
wherein the first network device, the second network device, and the third network device are included in a network;
receiving, by the first network device, a second advertisement message from the second network device,
wherein the second advertisement message includes a second BFD discriminator associated with a second link between the second network device and the third network device, the second BFD discriminator including information identifying the second link and a state of the second link;
pairing, by the first network device, the first BFD discriminator and the second BFD discriminator to form a BFD session between the first network device and the second network device;
detecting, by the first network device, a link failure associated with the first link between the first network device and the third network device; and
providing, by the first network device and via the BFD session, a BFD message to the second network device,
wherein the BFD message includes an indication of the link failure, and
wherein the BFD message is to cause the second network device to be a new designated forwarder for the third network device.

2. The method of claim 1, wherein:
the first advertisement message comprises at least one of an Ethernet virtual identifier (EVI), an Ethernet signature identifier (ESI), or a virtual local area network (VLAN) advertisement message, and
the second advertisement message comprises at least one of an EVI, an ESI, or a VLAN advertisement message.

3. The method of claim 1, wherein the BFD message is to cause the first network device to be a new backup designated forwarder for the third network device.

4. The method of claim 1, further comprising:
detecting, prior to detecting the link failure, a failure of the BFD session,
wherein the first network device is maintained as the designated forwarder for the third network device based on detecting the failure of the BFD session.

5. The method of claim 1, wherein the first link and the second link include Ethernet signature identifier (ESI) links.

6. The method of claim 1, wherein the network includes an Ethernet virtual private network (EVPN) that provides multihoming.

7. The method of claim 1,
wherein the information identifying the state of the first link identifies whether the first link is operational or failing, and
wherein the information identifying the state of the second link identifies whether the second link is operational or failing.

8. A first network device, comprising:
one or more memories; and
one or more processors to:
provide a first message to a second network device,
wherein the first message includes a first bidirectional forwarding detection (BFD) discriminator associated with a first link between the first network device and a third network device, the first BFD discriminator including information identifying the first link and a state of the first link, and
wherein the first network device, the second network device, and the third network device are included in a network;
receive a second message from the second network device,
wherein the second message includes a second BFD discriminator associated with a second link between the second network device and the third network device, the second BFD discriminator including information identifying the second link and a state of the second link;
permit a BFD session between the first network device and the second network device based on the first BFD discriminator and the second BFD discriminator;
detect a link failure associated with the first link between the first network device and the third network device; and
provide, via the BFD session, a BFD message to the second network device,
wherein the BFD message includes an indication of the link failure, and
wherein the BFD message is to cause the second network device to be a designated forwarder for the third network device.

9. The first network device of claim 8, wherein:
the first network device is the designated forwarder for the third network device prior to the link failure, and
the second network device is a backup designated forwarder for the third network device prior to the link failure.

10. The first network device of claim 8, wherein:
the first message and the second message comprise at least one of Ethernet virtual identifier (EVI), Ethernet signature identifier (ESI), or virtual local area network (VLAN) advertisement messages.

11. The first network device of claim 8, wherein the one or more processors are further to:
detect, prior to detecting the link failure, a failure of the BFD session,
wherein the first network device is maintained as the designated forwarder for the third network device based on detecting the failure of the BFD session.

12. The first network device of claim 8, wherein the BFD message is to cause the second network device to communicate traffic with the third network device, via the second link, after causing the second network device to be the designated forwarder for the third network device.

13. The first network device of claim 8, wherein the network includes an Ethernet virtual private network (EVPN) that provides multihoming.

14. The first network device of claim 8, wherein at least one of the first link or the second link includes an Ethernet signature identifier link.

15. A non-transitory computer-readable medium storing instructions, the instructions comprising:
one or more instructions that, when executed by one or more processors of a first network device, cause the one or more processors to:
permit a bidirectional forwarding detection (BFD) session with a second network device,
wherein the first network device is a designated forwarder for a third network device,
wherein a first link is provided between the first network device and the third network device,
wherein the second network device is a backup designated forwarder for the third network device, wherein a second link is provided between the second network device and the third network device, and wherein the first network device, the second network device, and the third network device are included in a network;

provide a first advertisement message to the second network device, wherein the first advertisement message includes a first BFD discriminator associated with the first link between the first network device and a third network device, the first BFD discriminator including information identifying the first link and a state of the first link;

receive a second advertisement message from the second network device, wherein the second advertisement message includes a second BFD discriminator associated with the second link between the second network device and the third network device, the second BFD discriminator including information identifying the second link and a state of the second link;

detect a link failure associated with the first link between the first network device and the third network device; and provide, via the BFD session, a BFD message to the second network device, wherein the BFD message includes an indication of the link failure, and wherein the BFD message is to cause the second network device to be a new designated forwarder for the third network device.

16. The non-transitory computer-readable medium of claim 15, wherein the instructions further comprise:

one or more instructions that, when executed by the one or more processors, cause the one or more processors to:

provide a first advertisement message to the second network device, wherein the first advertisement message includes a first BFD discriminator associated with the first link between the first network device and a third network device;

receive a second advertisement message from the second network device, wherein the second advertisement message includes a second BFD discriminator associated with the second link between the second network device and the third network device;

pair the first BFD discriminator and the second BFD discriminator; and wherein the one or more instructions, that cause the one or more processors to permit the BFD session with the second network device, cause the one or more processors to:

permit the BFD session with the second network device based on pairing the first BFD discriminator and the second BFD discriminator.

17. The non-transitory computer-readable medium of claim 15, wherein the BFD message is to cause the first network device to be a new backup designated forwarder for the third network device.

18. The non-transitory computer-readable medium of claim 15, wherein the instructions further comprise:

one or more instructions that, when executed by the one or more processors, cause the one or more processors to:

detect, prior to detecting the link failure, a failure of the BFD session, wherein the first network device is maintained as the designated forwarder for the third network device based on detecting the failure of the BFD session, and wherein the second network device is maintained as the backup designated forwarder for the third network device based on detecting the failure of the BFD session.

19. The non-transitory computer-readable medium of claim 15, wherein:

the first link and the second link include Ethernet signature identifier (ESI) links, and the network includes an Ethernet virtual private network (EVPN) that provides multihoming.

20. The non-transitory computer-readable medium of claim 15, wherein at least one of the first advertisement message or the second advertisement message includes at least one of an Ethernet virtual identifier, an Ethernet signature identifier, or a virtual local area network advertisement message.

* * * * *